No. 666,679. Patented Jan. 29, 1901.
O. KRAUS.
VELOCIPEDE PEDAL.
(Application filed Oct. 7, 1897.)

(No Model.)

WITNESSES:
Eugenie A. Perpides
Joseph Keeler.

INVENTOR:
Otto Kraus
BY
A. Faber du Faur
ATTORNEY

UNITED STATES PATENT OFFICE.

OTTO KRAUS, OF NEW YORK, N. Y., ASSIGNOR TO THE STEARNS BICYCLE AGENCY, OF SYRACUSE, NEW YORK.

VELOCIPEDE-PEDAL.

SPECIFICATION forming part of Letters Patent No. 666,679, dated January 29, 1901.

Application filed October 7, 1897. Serial No. 654,407. (No model.)

*To all whom it may concern:*

Be it known that I, OTTO KRAUS, a citizen of the United States of America, and a resident of New York, in the county and State of New York, have invented a certain new and useful Improvement in Velocipede-Pedals, of which the following is a specification.

My invention relates to that kind of attachment for the pedals of velocipedes that will give a yielding support for the foot and also prevent slipping. These attachments usually consist of two wide strips of rubber each held in place between a side of the pedal and a removable plate and each strip extending above and below said side and plate. The trouble with this construction is that when the "rubbers" have worn down to the pedal side they become worthless. My invention is designed to remedy this difficulty and to provide means whereby the rubbers can be thoroughly utilized by simply changing their positions between the pedal sides and the plates.

Figure 1:
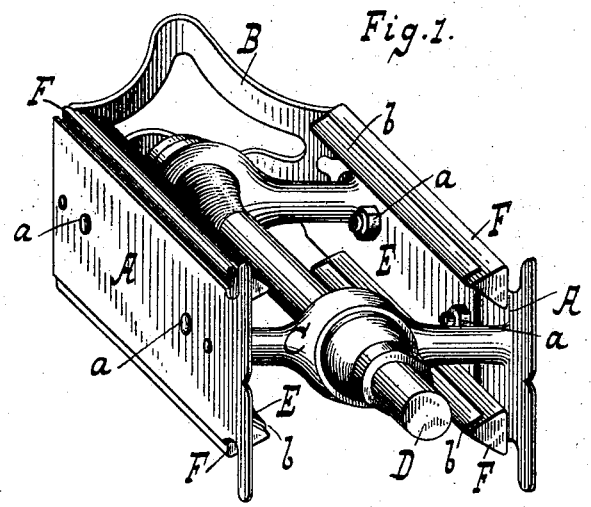
Figure 2:
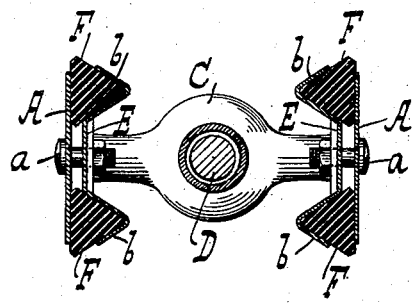
Figure 3:
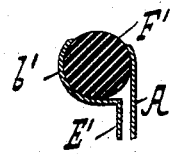
Figure 4:
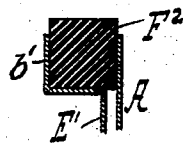

In the accompanying drawings, Figure 1 is a perspective view of a velocipede-pedal with my invention applied thereto. Fig. 2 is a transverse section of the same. Figs. 3 and 4 are details of modifications.

Similar letters represent like parts in all the figures.

The pedal shown in Figs. 1 and 2 is of the usual kind for bicycles, tricycles, and similar velocipedes and is composed of the two parallel side plates A A, end plate B, frame C, connecting the side plates, and the shaft D, on which said frame C is loosely journaled.

E E are two plates removably secured to the sides A A by screw-bolts $a$. Each of these plates E is provided with two parallel V-shaped grooves $b\ b$ at its top and bottom, respectively, and in each groove and between the plate E and side A is retained a prismatic-shaped strip F of rubber or other yielding and binding material, one edge of the strip and its two adjacent sides fitting in the groove $b$ and another edge extending beyond the plate E and side A, said edges of the two upper strips E forming the yielding support for the foot. If the projecting edge becomes worn down to the side A, the plate E can be loosened and the strip F withdrawn and replaced with another edge projecting from the side A. The strip F can be used in this way until each of its edges is worn down to the side A. Instead of the yielding strip being prismatic or triangular in cross-section it may have as many more sides and angles as desired so long as it is wide enough for the angles to extend beyond the side A and plate E.

In Fig. 3 I have shown the plate E' provided with an arched groove $b'$, the strip F' being cylindrical. If this construction be used, it is only necessary to loosen the plate E' and rotate the strip F' until an unworn surface extends beyond the plate E' and side A.

In Fig. 4 the strip $F^2$ is rectangular or square in cross-section and fits into a corresponding groove $b^2$ in the plate $E^2$. With this construction when the upper surface gets worn down the plate $E^2$ is loosened and the strip $F^2$, if square in cross-section, is turned so as to present another surface of said strip on top, or the strip $F^2$, if rectangular in cross-section, is moved outwardly, it being understood that before the plate $E^2$ is tightened again on the side A the strip must project beyond said side and plate.

The strips for the foot-support may be of rubber, leather, or any other material that will prevent the sole of a shoe or boot from slipping on the pedal, and these strips may be of any form in cross-section so long as they may be turned to present a new upper edge or surface and with a portion of the strip extending above the side A and plate E.

What I claim as new is—

1. In a velocipede-pedal, a longitudinally-grooved plate secured to the side of the pedal, non-slipable material having three or more surfaces seated and adapted to be rotatably adjusted therein and projecting above the side of the pedal, and means for adjusting said plate toward and from the side of the pedal to allow the non-slipable material to be adjusted to present three or more surfaces to the foot, substantially as described.

2. In a velocipede-pedal, a plate secured to the side of the pedal having two of its opposite edges terminating in longitudinal grooves, two separate strips of non-slipable material having three or more surfaces seated and adapted to be rotatably adjusted therein and projecting above the side of the pedal, and means for adjusting said plate toward and from the side of the pedal to allow the non-slipable material to be adjusted to present three or more surfaces to the foot, substantially as described.

In testimony that I claim the foregoing as my invention I have signed my name, in presence of two witnesses, this 28th day of August, 1897.

OTTO KRAUS.

Witnesses:
 EUGENIE A. PERSIDES,
 A. FABER DU FAUR, Jr.